United States Patent [19]

Reubke et al.

[11] 3,906,013

[45] Sept. 16, 1975

[54] PROCESS FOR THE MANUFACTURE OF NITRO-HYDROXY-ANTHRAQUINONES

[75] Inventors: Karl-Julius Reubke, Cologne; Walter Hohmann, Leverkusen; Hans-Samuel Bien, Burscheid, all of Germany

[73] Assignee: Bayer Aktiengesellschaft, Leverkusen, Germany

[22] Filed: Nov. 6, 1973

[21] Appl. No.: 413,228

[30] Foreign Application Priority Data
Nov. 6, 1972 Germany............................ 2254199

[52] U.S. Cl. ............................................... 260/383
[51] Int. Cl.² .......................................... C07C 49/75
[58] Field of Search ..................................... 260/383

[56] References Cited
UNITED STATES PATENTS
2,587,093   2/1952   Belshaw et al...................... 260/383
FOREIGN PATENTS OR APPLICATIONS
73,860   4/1893   Germany ............................ 260/383
1,126,890   4/1962   Germany ............................ 260/383

Primary Examiner—Paul F. Shaver
Attorney, Agent, or Firm—Plumley & Tyner

[57] ABSTRACT

Process for the manufacture of 1-hydroxy-5-nitro-anthraquinone or 1-hydroxy-8-nitro-anthraquinone, characterised in that 1,5-dinitro-anthraquinone or 1,8-dinitro-anthraquinone is reacted with alkaline compounds in polar aprotic solvents.

8 Claims, No Drawings

PROCESS FOR THE MANUFACTURE OF NITRO-HYDROXY-ANTHRAQUINONES

The present invention relates to a process for the manufacture of 1-hydroxy-5-nitro-anthraquinone and 1-hydroxy-8-nitro-anthraquinone, characterized in that 1,5-dinitro-anthraquinone or 1,8-dinitro-anthraquinone is reacted with alkaline compounds in polar aprotic solvents.

The reaction is carried out at temperatures of about 100°–200°C, preferably 130°–180°C. The molar ratio of dinitro-anthraquinone:alkaline compound should be about 1:0.3 to 1:3, preferably 1:0.5 to 1:1.5.

The polar solvent is used in a quantity ratio of about 1:1 to 1:5, preferably about 1:3.

Examples of suitable alkaline compounds are alkali metal hydroxides, alkali metal carbonates and alkaline earth metal oxides, such as NaOH, KOH, $Na_2CO_3$, $K_2CO_3$, MgO and CaO. CaO is preferred. Examples of suitable solvents are carboxylic acid amides which are liquid at the reaction temperatures, such as dimethylformamide, dimethylacetamide, tetramethylurea and N-methylpyrrolidone, and also sulpholane and dimethylsulphoxide. The reaction time depends on the solvent, the temperature and the nature of the alkaline compound. In general, it is the shorter, the more strongly alkaline is the alkaline compound and the higher is the solubility of the starting product.

Instead of the individual compounds 1,5-dinitro-anthraquinone and 1,8-dinitro-anthraquinone it is of course also possible to employ mixtures of the dinitro compounds mentioned, in which case mixtures of the corresponding nitro-hydroxy-anthraquinones are produced.

The nitro-hydroxy-anthraquinones are isolated in the usual manner, for example by precipitation with aqueous mineral acids such as hydrochloric acid or distilling off the solvent and subsequently stirring with aqueous mineral acids.

The products of the process are very pure. For example, if CaO is used, they contain less than 3% of the corresponding dihydroxy compound.

It is already known to manufacture hydroxy-nitro-anthraquinones from nitro-anthraquinones with at least two nitro groups by reaction with alkali metal nitrites. However, in this process a series of by-products are formed, which do not arise in the process according to the invention, especially nitration products of hydroxy-nitro-anthraquinone, preferably those with a nitro group in the o-position to the hydroxyl group.

EXAMPLE 1

150 g of N-methylpyrrolidone and 50 g of 1,5dinitro-anthraquinone are heated to 150°C, 9.5 g of (ground) CaO are added and the mixture is kept for 2 hours at this temperature. The starting product is no longer detectable in a thin layer chromatogram. The reaction mixture is worked up by distilling off the solvent and stirring the crude calcium salt with dilute hydrochloric acid or by pouring the mixture into water and acidfying with hydrochloric acid. Yield, 44 g of 1-hydroxy-5-nitro-anthraquinone. The 1-hydroxy-5-nitro-anthraquinone thus obtained contains 1.5% of 1,5-dihydroxy-anthraquinone, 2.5% of 1,8-dihydroxy-anthraquinone and 1.5% of 1-hydroxy-2,5-dinitro-anthraquinone. The melting point is 235–237°C.

Similar results are obtained if instead of 1,5-dinitro-anthraquinone, 1,8-dinitro-anthraquinone or a mixture of 1,5- and 1,8-dinitro-anthraquinone is employed. 1-Hydroxy-8-nitro-anthraquinone obtained according to this process melts at 238°–242°C.

EXAMPLE 2

50 g of sulpholane are heated to 180°C, 10 g of 1,5-dinitro-anthraquinone and 2 g of CaO are introduced and the mixture is stirred for a further 2 hours at 180°C. Thereafter, unconverted starting product and impurities are filtered off and the filtrate is worked up as described in Example 1. Yield, 6 g of 1-hydroxy-5-nitro-anthraquinone.

EXAMPLE 3

30 g of 1,5-dinitro-anthraquinone, 10 g of $K_2CO_3$ and 30 g of dimethylformamide are stirred for 6 hours at 130°C. About 5% of the starting product are still detectable in a thin layer chromatogram. The reaction product is isolated as described in Example 1. Yield, 21.7 g of 1-hydroxy-5-nitro-anthraquinone.

EXAMPLE 4

0.5 g of KOH (powder) is added to 10 g of 1,5-dinitro-anthraquinone in 100 g of sulpholane at 160°C, the melt is stirred for a further 15 minutes and poured into 500 g of 2% strength $H_2SO_4$ and the product is filtered off and washed until neutral.

Yield: 6 g of 1-hydroxy-5-nitro-anthraquinone.

EXAMPLE 5

20 g of 1,5-dinitroanthraquinone are heated to 175°C in 60 ml N-methylpyrrolidone; after addition of 2,7 g MgO, the mixture is stirred for 3 additional hours at a temperature of 175°C. The solvent is distilled off in vacuum, the residue suspended in water and brought to pH 2 – 3 with concentrated hydrochloric acid. After filtering off with suction, washing and drying 16,8 g 1-hydroxy-5-nitro-anthraquinone are obtained.

We claim:

1. A process for preparing 1-hydroxy-5-nitro-anthraquinone from 1,5- dinitroanthraquinone, or 1-hydroxy-8-nitro-anthraquinone from 1,8- dinitro-anthraquinone which comprises reacting 1,5-dinitro-anthraquinone or 1,8-dinitro-anthraquinone in a polar aprotic solvent with an alkaline compound selected from the group consisting of alkali metal hydroxide, alkali metal carbonate and alkaline earth metal oxide.

2. The process of claim 1 in which said polar aprotic solvent is a carboxylic acid amide which is liquid under the reaction conditions.

3. The process of claim 1 in which said polar aprotic solvent is N-methylpyrrolidone, dimethylsulphoxide or sulpholane.

4. The process of claim 1 in which said alkaline compound is NaOH, KOH, $Na_2CO_3$, $K_2CO_3$, MgO or CaO.

5. The process of claim 5 in which said alkaline compound is CaO.

6. The process of claim 1 in which said alkaline compound is CaO and said polar aprotic solvent is N-methylpyrrolidone, dimethylsulphoxide or sulpholane.

7. The process of claim 1 in which the reaction is conducted at 100°–200°C.

8. The process of claim 1 in which the molar ratio of said dinitroanthraquinone: alkaline compound is 1:0.3 to 1:3.

* * * * *